(12) United States Patent
Encio Martinez

(10) Patent No.: US 6,478,320 B2
(45) Date of Patent: *Nov. 12, 2002

(54) ANCHORING SYSTEM OF SPRING TO VEHICLE AXLE AND SPRING FOR VEHICLE AXLE

(75) Inventor: Jose Luis Encio Martinez, Ver de Bidasoa (ES)

(73) Assignee: Fundiciones de Vera, S. A. (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/551,452

(22) Filed: Apr. 18, 2000

(65) Prior Publication Data

US 2002/0096854 A1 Jul. 25, 2002

(30) Foreign Application Priority Data

Mar. 14, 2000 (ES) .......................................... 200000618

(51) Int. Cl.[7] ............................................. B60G 11/113

(52) U.S. Cl. .................................. 280/124.175; 267/52

(58) Field of Search ..................... 280/124.175, 124.17, 280/124.176; 267/52; B60G 11/113, 11/10

(56) References Cited

U.S. PATENT DOCUMENTS

| | | | | |
|---|---|---|---|---|
| 1,240,929 A | * | 9/1917 | Bissell | 267/52 |
| 3,190,632 A | * | 6/1965 | Barenyi | 267/52 |
| 3,305,231 A | * | 2/1967 | Boughner et al. | 267/52 |
| 3,469,860 A | * | 9/1969 | Hutchens | 267/52 |
| 6,082,750 A | * | 7/2000 | Merkler et al. | 280/124.175 |

* cited by examiner

*Primary Examiner*—Peter C. English
(74) *Attorney, Agent, or Firm*—Bierman, Muserlian and Lucas

(57) ABSTRACT

An anchoring system for a leaf spring on an axle of a vehicle. Two spaced apart flanges are rigidly affixed to the axle and are oriented generally perpendicular to the axle. The leaf spring is oriented generally perpendicular to the axle and is positioned between the two flanges. Holes in the side of the leaf spring are oriented parallel to the axle. Bolts extend through the two flanges and through the holes in the leaf spring to attach the leaf spring to the two flanges.

2 Claims, 2 Drawing Sheets

ANCHORING SYSTEM OF SPRING TO VEHICLE AXLE AND SPRING FOR VEHICLE AXLE

BACKGROUND OF THE INVENTION

1. Field of the Invention

This invention relates to an anchoring system for a spring of a vehicle and to the spring itself where, in a coordinate system, the spring is placed in an OX axis and the vehicle axle is in an OZ axis.

2. Description of the Related Art

The current system for anchoring springs to the axle involves fastening the spring by means of clamping plates, tightened with pins or clamps. The clamps surround the axle so that the grip is perpendicular, according to the OY axis.

This system is made up of an upper clamping plate, a lower one, the clamps and some nuts and washers as well as some other additional parts.

The number of parts that are used for the anchoring is excessive, which in turn creates logistic problems of storage-assembly, weight and price.

The spring is fastened by strongly anchoring it on the traction side, so the measurements and tolerances of the spring in the anchoring area, that is, on the flat and wide area of the spring, are important.

This anchoring gives rise to strong clamping between the spring and the axle, producing a large transmission of stress to the axle through this clamping.

In FIG. 1, Prior Art, a spring (2) is attached to axle (1), in this case, with square section. This section may be of other types, for example, round, with anchoring system according to OY Cartesian axis.

This anchoring system comprises:

Upper clamping plate (3) and lower clamping plate (4) which grip the axle (1) between them.

Anchoring plate (5) which, together with the upper clamping plate (3) grip the spring (2) between them.

Clamps (6) with nuts (7) grip the whole unit.

With this anchoring system the transmission of stress between the spring and the axle is on both upper and lower sides of the spring as the spring is attached to the axle through the clamping.

BRIEF SUMMARY OF THE INVENTION

The system targeted by the invention achieves better anchoring results as the axle receives less tension from the spring and reduces the number and weight of the parts that comprise the anchoring system. All of this is due to this system carrying out the grip in a lateral way, according to axis OZ.

The anchoring system of the invention consists of fastening/tightening the springs by means of a single-flange or two side clamping flanges attached with threaded rods, nuts and threaded rods, bolts, or nuts and bolts to keep it strongly anchored. These clamping flanges are attached to the axle, for example, by means of welding.

The spring is fastened by strongly anchoring it by the sides, therefore, the measurements and tolerances of the sides are important, reducing the importance of the tolerances of the flat area on the traction side, as occurs in the existing springs.

The spring of the invention is characterized because it has through or blind openings on the sides of the spring to fit mechanical means for fastening the spring to the vehicle axle.

In order to understand the object of this invention better, a preferential way of practicing the invention is shown in to changes that take nothing away from its basic aspects.

DETAILED DESCRIPTION OF THE INVENTION

Figure 1:
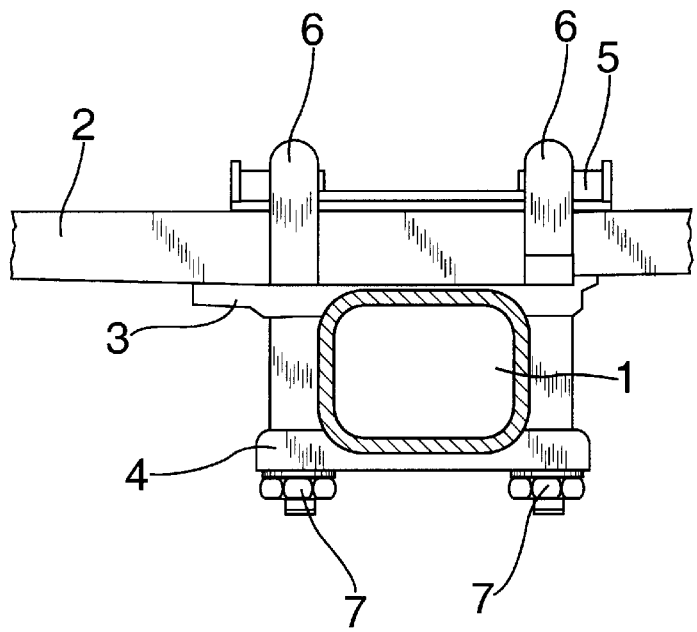
FIG. 1 is a diagram of the anchoring system currently used.
Figure 2:
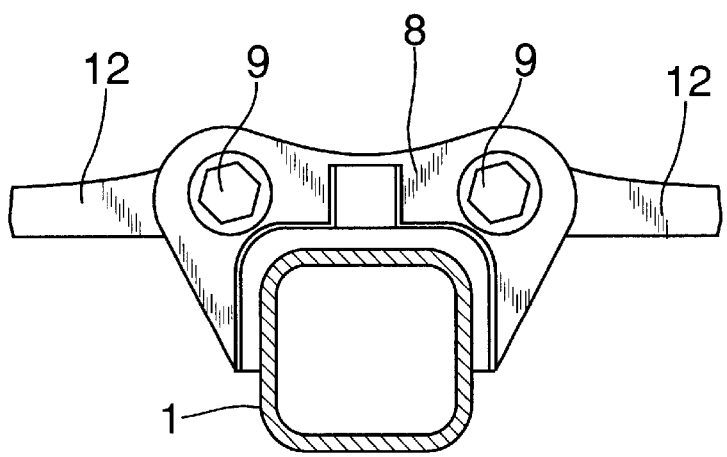
FIG. 2 is a diagram of a practical execution of the anchoring system of the invention.
Figure 3:
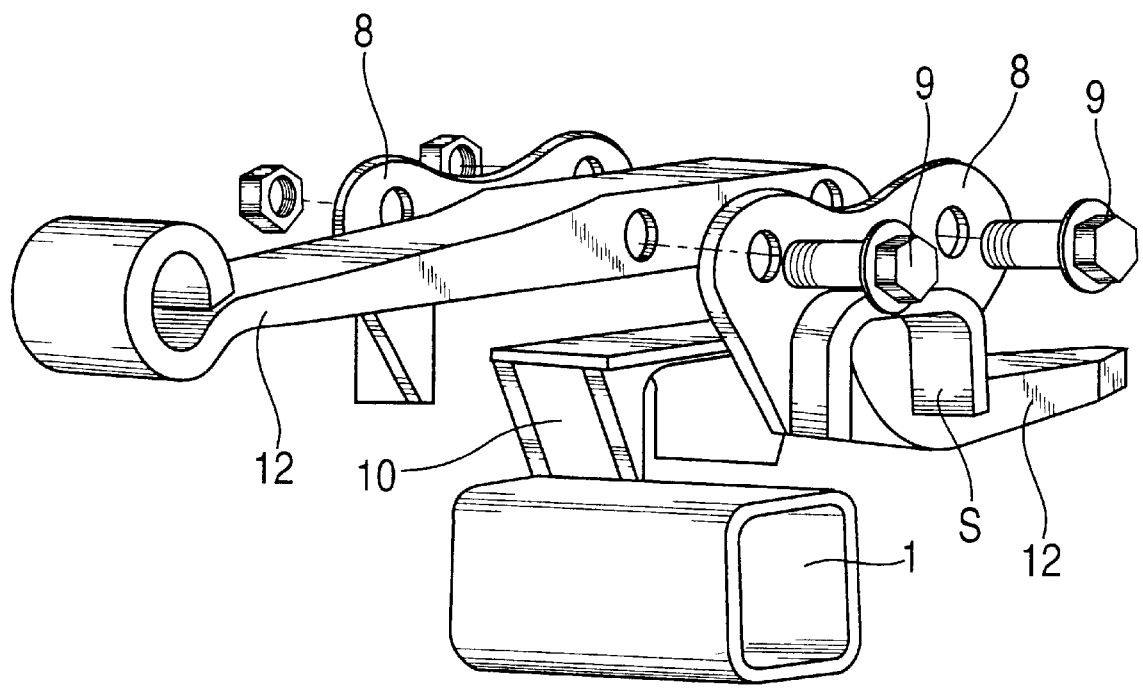
FIG. 3 is an exploded view of FIG. 2.

Below is an example of a practical execution of this invention. It is not limitative.

In the system of the invention many fewer parts are used, so the unit is not as heavy, not as complicated and more economical, managing to reduce the stress on the axle.

In order to achieve this, it has an anchoring system according to the OZ Cartesian axis, that is, with lateral anchoring on the spring (12), where the OZ axis is the longitudinal axis of the vehicle axle (1).

There is at least one flange (8), which is rigidly attached to the axle (1) and is attached from the side by threaded rods, nuts and threaded rods, bolts, or nuts and bolts (9) to the spring (12) which go through the side of the spring (12).

Preferably, there will be two flanges (8) in this system, which are tightened, one on each side, to the spring (12) by means of at least two threaded rods, nuts and threaded rods, bolts, or nuts and bolts (9). Secured between the two flanges (8) and between the spring (12) and the axle (1) is support plate (10). It will be seen that the threaded rods, nuts and threaded rods, bolts, or nuts and bolts (9) cross the body of the spring (12).

Both the flanges (8) and the support plate (10) have a lower surface (S) which conforms to the shape of the axle (1).

One of the flanges (8) or both may have an extension (not shown) which extends between spring (12) and axle (1) and carries out support functions the same as the support plate (10).

Preferably, the flanges (8) will be welded to the axle (1), but part of the object of the invention is that they are attached to the axle (1) by other rigid attachment means, for example, by extending each flange (8) around the axle (1) and screwing the lower ends together, that is, clamping each flange (8) to the axle (1).

Alternately, the support plate (10) is secured to the axle (1) and the flange(s) (8) are attached to this support plate (10). This case would be no more than a realization of the flange(s) (8) with an extension, which acts as support.

The two flanges (8) and the support plate (10) forming one single part is also part of the object of the invention.

What is claimed is:

1. An anchoring system for a leaf spring on an axle of a vehicle comprising:

two flanges spaced apart and rigidly affixed to the axle of the vehicle, said flanges oriented generally perpendicular to said axle;

a leaf spring oriented generally perpendicular to said axle and having holes in the side of said leaf spring and oriented parallel to said axle, said spring positioned between said two flanges and said holes positioned between said two flanges;

bolts oriented parallel to said axle which extend through said two flanges and through said holes in said leaf spring to attach said leaf spring to said two flanges.

2. The system of claim 1 further comprising a support plate positioned between said two flanges and between said leaf spring and said axle.

* * * * *